(12) United States Patent
Lavingia

(10) Patent No.: US 9,082,146 B1
(45) Date of Patent: Jul. 14, 2015

(54) SYSTEM, METHOD, AND MEDIUM FOR GENERATING CACHED PRODUCT INFORMATION PAGES

(71) Applicant: Gumroad, Inc, San Francisco, CA (US)

(72) Inventor: Sahil Lavingia, San Francisco, CA (US)

(73) Assignee: Gumroad, Inc., San Francisco, CA (US)

( * ) Notice: Subject to any disclaimer, the term of this patent is extended or adjusted under 35 U.S.C. 154(b) by 277 days.

(21) Appl. No.: 13/689,208

(22) Filed: Nov. 29, 2012

(51) Int. Cl.
*G06Q 30/00* (2012.01)
*G06Q 30/06* (2012.01)
*G06Q 20/08* (2012.01)
*G06Q 20/12* (2012.01)

(52) U.S. Cl.
CPC ........ *G06Q 30/0635* (2013.01); *G06Q 20/0855* (2013.01); *G06Q 20/12* (2013.01); *G06Q 30/0623* (2013.01); *G06Q 30/0641* (2013.01)

(58) Field of Classification Search
CPC ........... G06Q 30/0631–30/0643; G06Q 30/08; G06Q 20/00–20/201; G06Q 20/36–20/3678; G06Q 20/38; G06Q 20/382; G06Q 20/383; G06Q 20/387

USPC ................................................ 705/26.1–27.2
See application file for complete search history.

(56) References Cited

U.S. PATENT DOCUMENTS

| | | | |
|---|---|---|---|
| 8,275,661 B1* | 9/2012 | Ponte et al. ................. | 705/14.54 |
| 2011/0184834 A1* | 7/2011 | Perrochon et al. ........... | 705/26.8 |
| 2012/0078731 A1* | 3/2012 | Linevsky et al. ........... | 705/14.73 |
| 2012/0278223 A1* | 11/2012 | Lutnick et al. .................. | 705/37 |
| 2014/0249964 A1* | 9/2014 | Kubicki ..................... | 705/26.64 |

OTHER PUBLICATIONS http://pages.cs.wisc.edu/~zj/active-cache. "Active Cache: Caching Dynamic Documents". Pei Cao. May 2, 1998.*

* cited by examiner

*Primary Examiner* — William Allen
(74) *Attorney, Agent, or Firm* — Van Pelt, Yi & James LLP

(57) ABSTRACT

Enabling price updates is described, including: receiving a request from a customer to review a set of product information associated with a product; sending the set of product information including a price associated with the product to the customer; receiving an update to the price from a seller associated with the product; receiving a request to buy the product from the customer; in response to the request to buy the product, determining that the price has been updated by the seller; and sending a message associated with a change in price to the customer.

19 Claims, 12 Drawing Sheets

Powered by

Powered by

SYSTEM, METHOD, AND MEDIUM FOR GENERATING CACHED PRODUCT INFORMATION PAGES

BACKGROUND OF THE INVENTION

In some existing commerce websites, a seller is limited in the number of times that he may change the price of a product over a given period. For example, a typical website may permit a seller to modify the price of a product only once in every 24 hour period. At such a website, a user may modify the price at some point during the 24 hour period, but the change in price will not be propagated to potential customers who view information associated with the product until a predetermined time associated with implementing price updates. If the period in which the price of a product may be changed is once every 24 hours, at midnight each day, for example, a submitted price update will be propagated to potential customers. In other words, after midnight, the predetermined time associated with implementing price updates, a potential customer that views information for the product at the website will see the updated price, instead of the older price. In some websites, subsequent to a seller updating a price of a product, customers are prohibited from buying the product at the website until the predetermined time associated with implementing price updates has passed. Therefore, it would be desirable to use a more flexible technique of propagating price updates.

BRIEF DESCRIPTION OF THE DRAWINGS

Various embodiments of the invention are disclosed in the following detailed description and the accompanying drawings.

DETAILED DESCRIPTION

Figure 1:
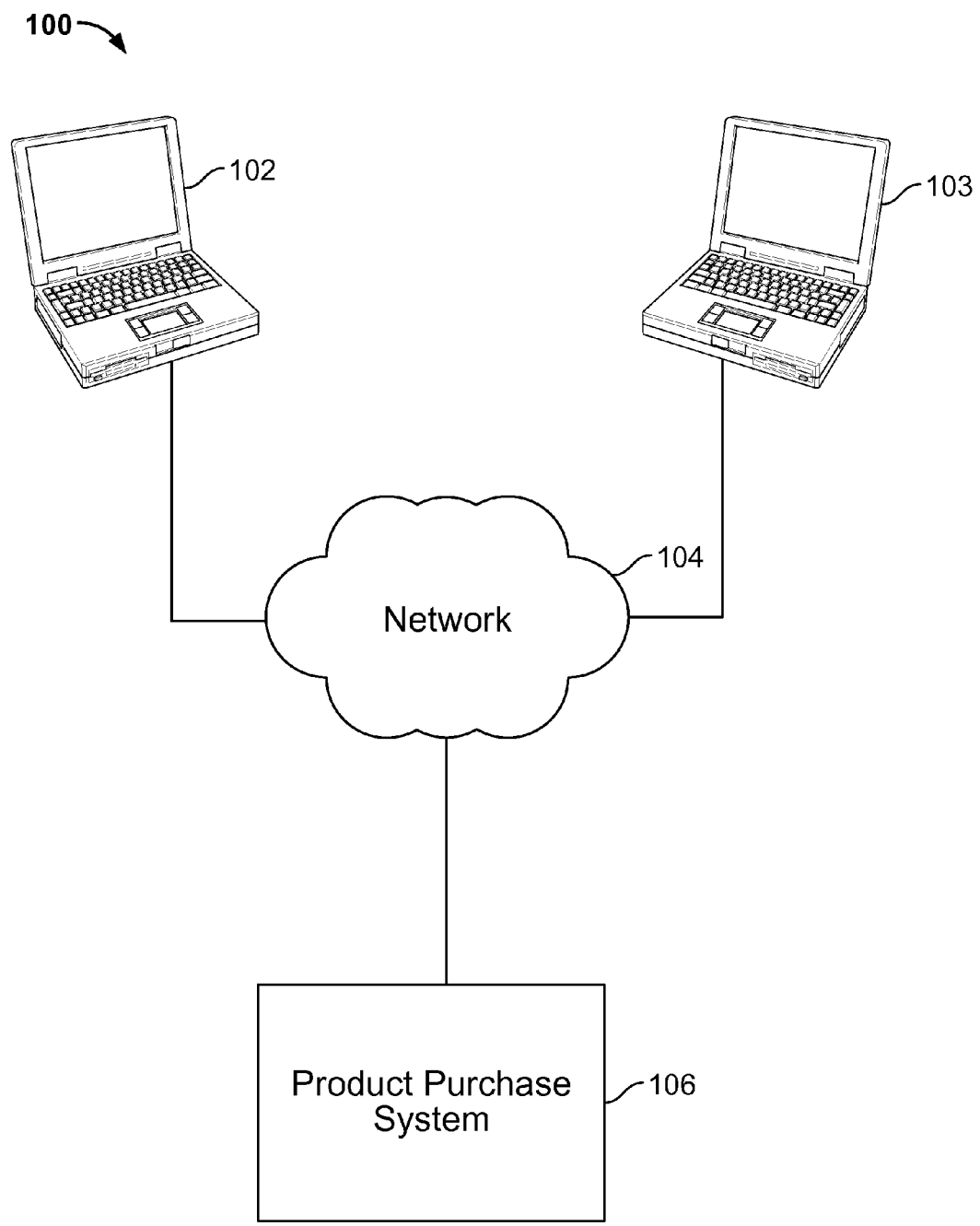
FIG. 1 is a diagram showing an embodiment of a system for enabling price updates.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enabling price updates is described herein. A request from a customer to review a set of product information associated with a product is received. In various embodiments, the set of product information associated with the product includes at least the price of the product among other attributes of the product (e.g., name, description, format, size, a preview associated with the product, etc.). In various embodiments, the set of product information associated with the product is submitted by a seller of the product at a product purchase system. A seller may comprise a user with a registered account with the product purchase system, for example. In response to the request, the set of product information is sent to the customer. For example, the set of product information may be presented to the customer at a device used by the customer. A request to buy the product is received from the customer. In response to the request to buy the product, it is determined that the price has been updated by the seller. In some embodiments, a message associated with a change in price is sent to the customer and confirmation from the customer associated with the request to buy the product is requested.

By notifying the customer who has decided to purchase a product, whose price has changed from the price that the customer had viewed in the requested product information, the customer is given the opportunity to not proceed with buying the product, especially in the event that the price has increased to an amount that the customer does not wish to pay. The seller, on the other hand, is given more flexibility to update the price of a product at any time and have the updated price be propagated throughout the product purchase system in a real-time manner that does not detrimentally affect the potential customers who had requested to buy the product at the price before the update.

FIG. 1 is a diagram showing an embodiment of a system for enabling price updates. In the example, system 100 includes device 102, device 103, network 104, and/or product purchase system 106. Network 104 includes high-speed data networks and/or telecommunications networks.

Device 102 and device 103 are each configured to communicate with product purchase system 106 over network 104. While device 102 and device 103 are shown to be laptops in the example, other examples of device 102 and device 103 include desktop computers, smart phones, mobile devices, tablet devices, or any other computing devices.

In some embodiments, a seller who wishes to sell a product with product purchase system 106 may access a website associated with product purchase system 106 using device 102. Examples of products that may be sold using product purchase system 106 include virtual and digital goods such as audio files, digital files, eBooks, image files, coupon codes, video games, applications, software, tickets, Google® documents, Instagram® photos, and podcast files. Other products that may be sold using product purchase system 106 include physical products. In some embodiments, product purchase system 106 may be accessed via an associated website at a uniform resource locator (e.g., such as "www.gumroad.com," for example) using a web browser application installed at device 102. At the website associated with product purchase system 106, an interactive webpage may be presented where the seller may input/upload a set of product information associated with a product for sale. The set of product information may include one or more of the following: the price of the product, an identification (e.g., a name or title) of the product, a file associated with the product, a description of the product, a file associated with a preview of the product, and/or other metadata (e.g., file size, file format, time period of availability) associated with the product. In some embodiments, the set of product information is stored by product purchase system 106.

In some embodiments, a customer who wishes to buy a product with product purchase system 106 may access a website associated with product purchase system 106 using device 103. In some embodiments, product purchase system 106 is configured to generate a link, button, and/or other selectable element for a set of product information such that a customer who would like to review the product information on a particular product may activate the link, button, and/or selectable element associated with that product to request the product information. In some embodiments, product purchase system 106 is configured to present the generated link, button, and/or selectable element (or its associated computer code) to the seller. Then the seller may copy the link, button, and/or selectable element (or its associated computer code) and display the link, button, and/or selectable element at another website of the seller's choice. For example, the seller may present the link, button, and/or selectable element at his or her profile at a social network platform (e.g., Facebook® or Twitter®) or other website (e.g., personal website or blog website) such that other users with access to see posts by the seller may be able to view the link.

In some embodiments, a customer who sees the presented link, button, and/or selectable element at the website at which it is displayed may become potentially interested in purchasing a product associated with the link, button, and/or selectable element. To request to review the product information associated with the product, in some embodiments, the customer may select the presented link, button, and/or selectable element.

In some embodiments, product purchase system 106 may receive an update to the price from the seller. In some embodiments, product purchase system 106 permits the seller to update attributes associated with a product, such as the price, subsequent to submitting an initial set of product information for the product. In some embodiments, product purchase system 106 is configured to permit the seller to update attributes associated with the product, such as the price, at any time. In other words, product purchase system 106 does not limit the number of times that the seller may update the product information, such as the price, of a product. For example, the seller may modify the price to be greater than the previously submitted price or to be less than the previously submitted price.

In various embodiments, in response to the request to review a set of product information associated with a product, product purchase system 106 is configured to send the set of product information associated with the product to device 103, which is used by the customer. For example, the set of product information is to be displayed at device 103 for the customer. The set of product information includes at least the price of the product among other product attributes (e.g., name, description, format, size, a preview associated with the product, etc.). Product purchase system 106 may receive a request to buy the product from the customer. For example, to indicate a request to buy the product, the customer may select a control associated with purchasing the product and, for example, the control may have been sent with the product information. In some embodiments, product purchase system 106 is configured to propagate the updated price through the system, as will be further described below.

In some embodiments, in response to the request by the customer to buy the product, product purchase system 106 is configured to determine whether the price has been updated by the seller after product purchase system 106 sent the set of product information to the customer.

In the event that product purchase system 106 determines that the price has been updated, product purchase system 106 is then configured to send a message to the customer informing the customer of the price update and also request confirmation that the customer still desires to proceed with the purchase of the product at the updated price. For example, a customer may request to review a set of product information and receive it. The sent set of product information may include a first price. Then, before the customer requests to purchase the product, the seller submits a second, updated price to replace the first price. Because the price of the product had changed from the first price to the second price while the customer was presented with the first price with the set of product information, in response to the customer's request to buy the product (at the expected first price), a message is sent to the customer to notify the customer that the price has been updated. At this point, the customer may hold off on buying the product until he sees the second, updated price and decides that he is comfortable with paying the new amount or the customer may forgo buying the product upon seeing the second, updated price. Either way, the customer is made aware of the update in price from the price shown to him in the presented product information before he confirms his purchase of the product.

In the event that product purchase system 106 determines that the price has not been updated, then product purchase system 106 is configured to store the updated price with the set of product information. Then in response to a subsequent request by the same customer or another customer to review the set of product information associated with the product, product purchase system 106 is configured to send the updated price with the product information.

As described above, product purchase system 106 is configured to propagate an update to the price of a product in real-time either by sending a message associated with the price update to a customer who was sent the price prior to the update and has requested to buy the product and/or by storing the updated price so that it can be sent in response to a subsequent request by a customer to review the product information.

Figure 2:
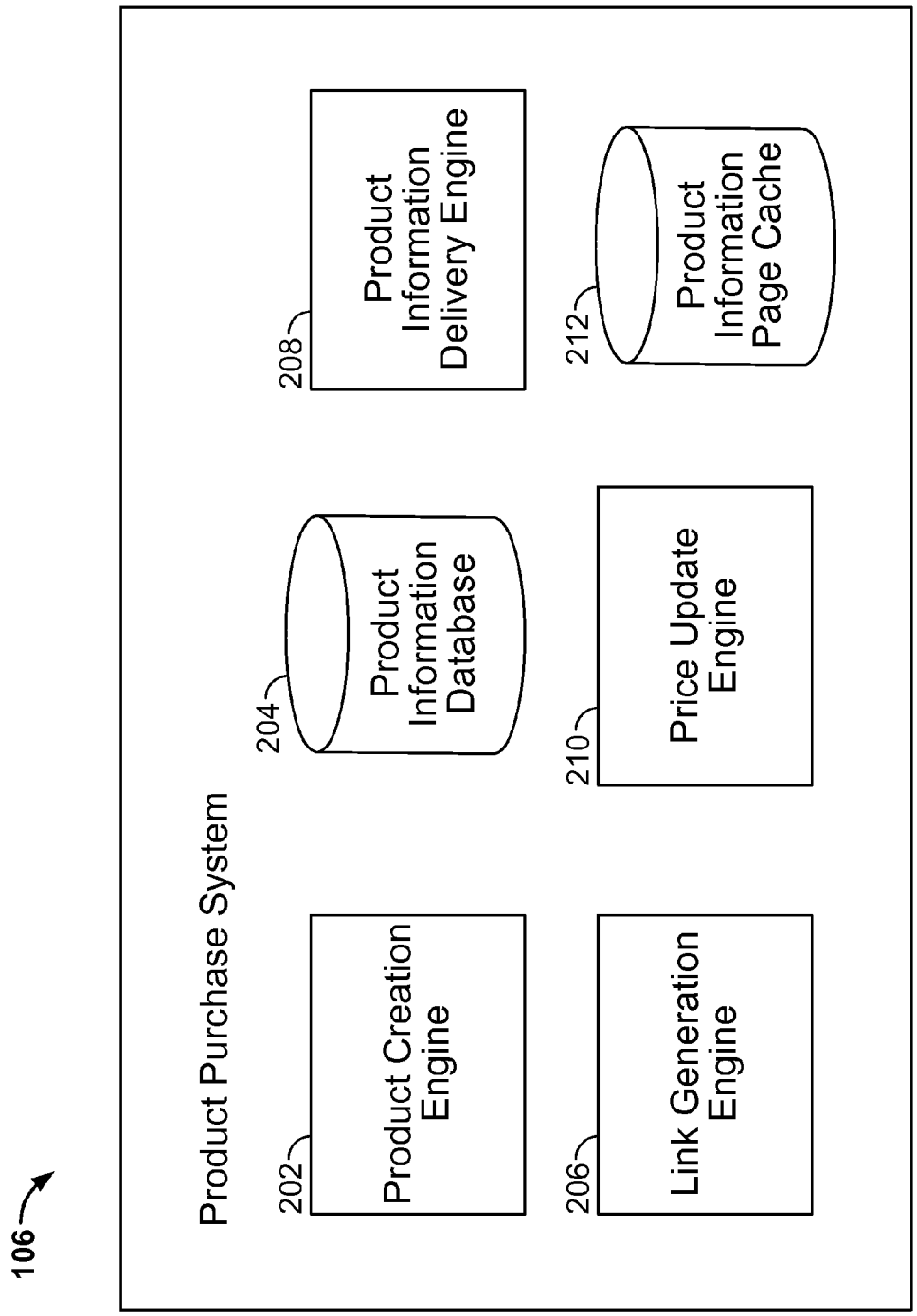
FIG. 2 is a diagram showing an embodiment of a product purchase system.

FIG. 2 is a diagram showing an embodiment of a product purchase system. In some embodiments, product purchase system 106 of system 100 may be implemented using the example of a product purchase system shown in FIG. 2. In the example, the product purchase system includes product creation engine 202, product information database 204, link generation engine 206, product information delivery engine 208, price update engine 210, and product information page cache 212. Each of product creation engine 202, link generation engine 206, product information delivery engine 208, and price update engine 210 may be implemented using one or both of hardware and software. Product information database 204 may be implemented using one or more databases. Product information page cache 212 may be implemented using any appropriate storage medium (e.g., disk storage or flash storage).

Product creation engine 202 is configured to receive (e.g., from a seller submitting over a webpage associated with the product purchase system) a set of product information associated with a product on sale. In some embodiments, the set of product information includes at least a price and an identification associated with the product. In some embodiments, the set of product information also includes an upload of a file associated with the product. For example, the upload of the product may be the product itself, a preview of the product, and/or other media related to the product. In some embodiments, if a preview is not uploaded, product creation engine 202 is configured to automatically generate a preview based on the received set of product information. In some embodiments, product creation engine 202 is configured to present the preview with at least a portion of the set of product information and, in some embodiments, other attributes of the uploaded file(s) that are detected by product creation engine 202. In some embodiments, one or more indications associated with modifying the preview may be received by product creation engine 202 and product creation engine 202 is configured to store the modified preview. For example, the modified preview may be replaced by a new preview file uploaded by the seller user. In some embodiments, product creation engine 202 is configured to store the received product information with the preview associated with the product at product information database 204.

Product information database 204 is configured to store sets of product information and previews associated with various products for sale at the product purchase system. In some embodiments, a set of product information and associated preview is stored for each product. In some embodiments, each set of product information includes at least a price and an identification (e.g., the name or title) of the product. In some embodiments, at least some of the sets of product information are stored with additional information such as a file associated with the product, a description of the product, a file associated with a preview of the product, and/or other metadata (e.g., file size, file format, time period of availability) associated with the product. In some embodiments, at least some of the sets of product information stored at product information database 204 are received from product creation engine 202. In some embodiments, each set of product information includes information that is submitted by a user at a webpage and/or automatically recognized by product creation engine 202 of any files uploaded by the user at the webpage. In some embodiments, updated prices submitted by sellers for products whose sets of product information are stored by product information database 204 are received. In some embodiments, in response to receiving an updated price for a particular product, product information database 204 is configured to store the updated price with the set of product information corresponding to that product. For example, product information database 204 may store, at least temporarily, both the price before the recent update and also the current price after the recent update. In another example, product information database 204 may delete the price before the recent update and only store the current price after the recent update. In some embodiments, product information database 204 is configured to store timing information associated with when each price update was received.

Link generation engine 206 is configured to generate links, buttons, and/or other selectable elements associated with enabling purchases of products. In some embodiments, link generation engine 206 is configured to generate a link, button, and/or other selectable element based at least in part on a portion of each set of product information and its preview. In some embodiments, each generated link, button, and/or other selectable element is unique for each set of product information. In some embodiments, when activated, each link, button, and/or other selectable element is configured to cause product information delivery engine 208 to deliver at a webpage the set of product information and a control associated with the product associated with the link. In some embodiments, the associated preview is also delivered with the set of product information and the control. The link, button, and/or other selectable element is presented at a webpage associated with the product purchase system for the seller who submitted the set of product information. The seller may then copy and publish/share the link at a desired webpage (e.g., of a blog or social network platform) so that the visitors of (e.g., with privileges to access) the webpage may be able to purchase the product through activating the presented link, button, and/or other selectable element.

Product information delivery engine 208 is configured to deliver sets of product information in response to activation of links, buttons, and/or selectable elements associated with the product purchase system. In some embodiments, in response to an activation of a link, button, and/or selectable element, product information delivery engine 208 is configured to deliver the set of product information associated with the product associated with the link, along with a control that is associated with requesting to view a payment form associated with the product. In some embodiments, an associated preview is delivered by product information delivery engine 208 with the set of product information and control. In some embodiments, product information delivery engine 208 is configured to deliver at least the set of product information at a webpage different than the webpage the link was published at.

In some embodiments, product information delivery engine 208 is configured to retrieve a cached page from product information page cache 212 that corresponds to the set of product information associated with the selected link, button, and/or selectable element. In some embodiments, if there is more than one cached page that corresponds to the set of product information, then the page that includes the most up-to-date product information (e.g., the most up-to-date price) is retrieved. For example, the static page may include the name of the product, the current price of the product, the description of the product, and a preview of the product. For example, the page may be generated using mark-up language (e.g., HTML). In some embodiments, the generated static page for each set of product information is stored at product information page cache 212. In some embodiments, the retrieved product information page is presented with one or more other elements, such as a control associated with requesting to view a payment form associated with the product and/or in some embodiments, dynamic information (e.g., the customer's stored credit card information) is automatically populated into fields of the product information page (e.g., subsequent to loading the product information page).

In some embodiments, in response to a selection of the control associated with viewing a payment form associated with the product, product information delivery engine 208 is configured to present a form associated with receiving payment information. In some embodiments, the form associated with receiving payment information may be included in the cached product information page and in some embodiments, the form associated with receiving payment information may not be included in the cached product information page. In some embodiments, the form includes fields associated with payment information and contact information for the customer to complete and/or at least a portion of the fields are automatically populated with stored information associated with the customer (e.g., the customer's credit card information).

In some embodiments, in the event that the customer submits the form with filled-in payment information to request purchase of the product, before permitting the transaction to complete, product information delivery engine 208 is configured to query price update engine 210 to determine whether the price of the product has been updated since the set of product information was delivered to the customer. In some embodiments, price update engine 210 may periodically query product information database 204 for price updates and store data that identifies for which sets of product information prices have been updated (e.g., since a previous query) and when the updates occurred. In some embodiments, in response to a query from product information delivery engine 208 regarding updates to prices, price update engine 210 may be triggered to query product information database 204 for any updates to prices included in the stored sets of product information.

In the event that price update engine 210 determines that the price of the product has been updated since the set of product information (including the price before the update) was delivered to the customer, then price update engine 210 is configured to send a message to the customer alerting the customer of the update in price and to request a confirmation from the customer for purchasing the product. In some embodiments, the seller may submit a configuration associated with the set of product information for the price that indicates when such a message may be appropriate to send to the customer. For example, the seller may configure that a customer who has been presented the price with the delivered product information before the update may continue to purchase the product at the price before the update (in other words, a customer who has seen the price prior to the price update may be "grandfathered in" to buy the product at the now outdated price that he saw). In another example, the seller may configure that such a message to the customer to alert the customer of a price update need only be sent if the updated price is greater than the previous price (e.g., based on the assumption that the customer would not change his mind regarding buying a product whose price has decreased at the time of purchase). In some embodiments, the customer who was sent the message indicating an update in price may view the updated price by refreshing the webpage and then confirm the request to purchase the product by submitting payment information again. Otherwise, in the event that price update engine 210 determines that the price of the product has not been updated since the set of product information (including the price before the update) was delivered to the customer, product information delivery engine 208 proceeds to authenticate the payment information that was submitted through the form.

In the event that the information submitted through the form is authenticated, product information delivery engine 208 is configured to present a buyer receipt and a secure download link configured for downloading a file associated with the product (e.g., the file may be the product itself if the product is digital). In some embodiments, in addition to presenting the buyer receipt, product information delivery engine 208 is also configured to send a copy of the buyer receipt to the contact information submitted by the customer through the payment information form.

In some embodiments, price update engine 210 is configured to generate a static page for each set of product information associated with a particular product. For example, the static page may include the name of the product, the current price of the product, the description of the product, and a preview of the product. For example, the page may be generated using mark-up language (e.g., HTML). In some embodiments, the generated static page for each set of product information is stored at product information page cache 212. In some embodiments, in response to determining that an update to a price included in a set of product information has been received at product information database 204, price update engine 210 generates a new product information page with the updated price and caches the page at product information page cache 212. Furthermore, once the new product information page has been cached, a previously cached page for the product that includes the price before the update, in some embodiments, is deleted and in some embodiments, is temporarily maintained but marked as being out-of-date. Then in response to a subsequent request from a customer to review the set of product information for the product, product information delivery engine 208 may retrieve the new product information page, which is the most up-to-date page and includes the most up-to-date price, to deliver to the customer. Generating and caching product information pages in advance (as opposed to generating product information pages dynamically in response to a request to review such information) may save some time in delivering the product information to the requesting customers.

Figure 3:
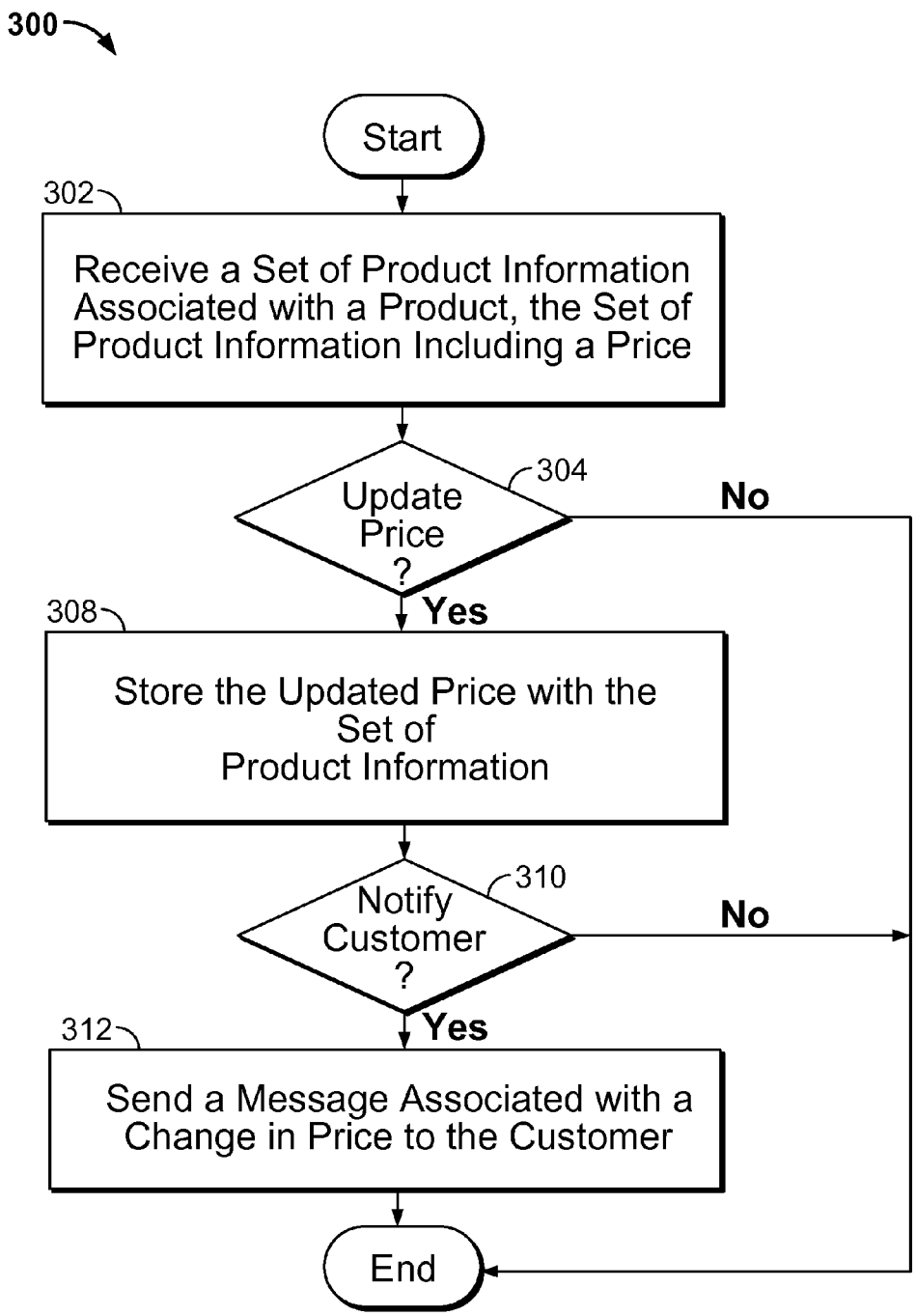
FIG. 3 is a flow diagram showing a process associated with receiving price information submitted by the seller of a product.

FIG. 3 is a flow diagram showing a process associated with receiving price information submitted by the seller of a product. In some embodiments, process 300 may be implemented at a system such as system 100 of FIG. 1.

Process 300 may be used to determine whether an update has been made to the price of the product and if so, whether the update to the price is to cause a message to be sent to a customer.

At 302, a set of product information associated with a product is received, the set of product information including a price. For example, a seller that wishes to create a product for sale may submit a set of product information. The set of product information includes at least a price and an identification (e.g., name) of the product. For example, the seller may submit the set of product information at a user interface provided at a website associated with the product purchase system. The set of product information is then stored. At 304, it is determined whether an update to the price has been received. In the event that an update to the price has been received, control passes to 308. The seller may later decide to update the price of the product for which he previously submitted the set of product information. For example, the seller may wish to incentivize more sales of the product by lowering the price. Or, for example, the seller may wish to potentially earn more profit by raising the price. For example, to update the price of the product, the seller may return to the user interface of the product purchase system and make a selection at the user interface associated with editing the product information. Otherwise, in the event that an update to the price has not been received, the process ends. At 308, the updated price is stored with the set of product information. In some embodiments, the updated price is stored with timing information associated with when it was received by the product purchase system. In some embodiments, the updated price is stored and the previous price is deleted. In some embodiments, the updated price is stored and the previous price is at least temporarily maintained. At 310, it is determined whether a customer is to be notified. In some embodiments, in the event it is determined that the price was updated subsequent to the presentation of the previous price to a customer and prior to the customer requesting to buy the product, the customer is notified of the change in price. In some embodiments, in the event it is determined that the price was updated subsequent to the presentation of the previous price to the customer and regardless of whether the customer requested to buy the product, the customer is to be notified of the change in price. In the event that it is determined that a customer is to be notified, control passes to 312. Otherwise, in the event that it is determined that no customer is to be notified, the process ends. At 312, a message associated with a change in price is sent to the customer. For example, a popup message (e.g., enabled using JavaScript) may be sent to the customer to alert the customer that the price has changed (from the price that was included in the set of product information that was/is being reviewed by the customer).

Figure 4:
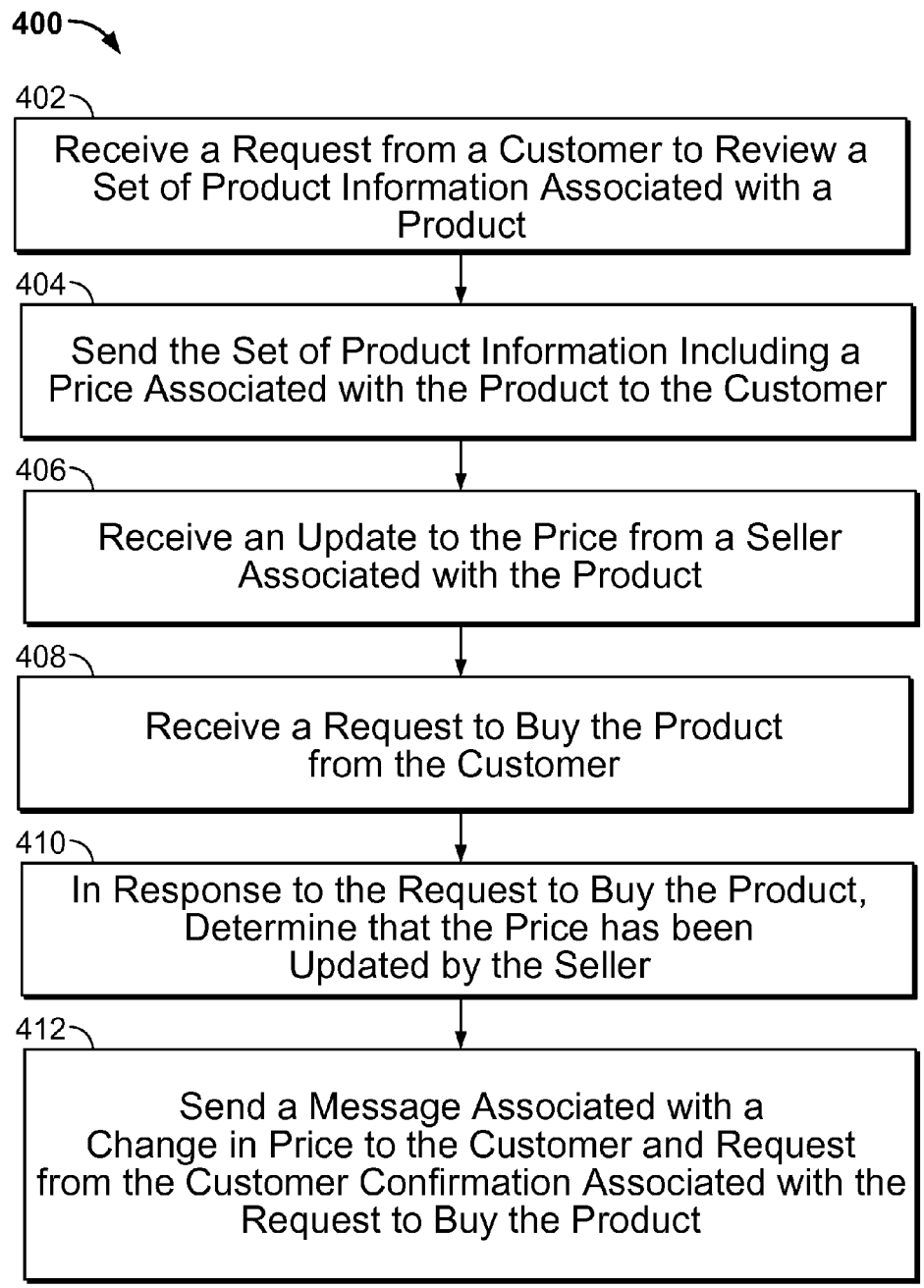
FIG. 4 is a flow diagram showing an embodiment of a process for enabling price updates.

FIG. 4 is a flow diagram showing an embodiment of a process for enabling price updates. In some embodiments, process 400 may be implemented at system 100.

At 402, a request to review a set of product information associated with a product is received from a customer. For example, the customer is browsing another user's page at a social media platform and sees a shared link associated with a product that the customer is interested in. The customer then clicks on the link to request to review the set of product information associated with the link. At 404, the set of product information including a price associated with the product is sent to the customer. A webpage including some product information associated with the product, including the price of the product, and, for example, the product's name, may be sent to the customer. In some embodiments, the webpage may be presented at a different website from the website at which the customer found the link. In some embodiments, the webpage may be presented as an overlay to the same website at which the customer found the link. At 406, an update to the price is received from a seller associated with the product. The seller submits an update to the price some time after the customer was sent the set of product information including the price before the update. Despite the update to the price of the product, the product is still in an orderable state (i.e., there is no blackout period in which purchases are temporarily prevented that follows a price update) because the price update will be propagated throughout the product purchase system in real-time. At 408, a request to buy the product is received from the customer. The customer who was sent the set of product information before the update then clicks on a button associated with purchasing the product. For example, the button may comprise the submit button to the payment information form (i.e., the customer's submission of payment information, such as credit card information, triggers the request to buy the product). In another example, the button may comprise the button to pull up the payment information form (i.e., the customer's selection of a control to view the payment information form itself triggers the request to buy the product). At 410, in response to the request to buy the product, it is determined that the price has been updated by the seller. It is determined whether the seller has submitted an update to the price that was included in the set of product information that was sent to the customer. In some embodiments, the seller may be able to configure the conditions in which a message associated with a change in price should be sent to the customer. For example, the seller may configure that a message should only be sent to the customer if the updated price is greater than the price before the update. This configuration may be based on the assumption that the customer would not mind not knowing about a price drop and purchasing the same product at a lower price, but would expect a notification if the price of the same product had increased. In another example, the seller may configure that a message should be sent to the customer in the event of any update to the price, regardless of whether the price was increased or decreased. This configuration may be based on the assumption that a customer might prefer to be made aware of any type of change to a product so that they are clear about what they are buying and how they are buying it. At 412, a message associated with a change in price is sent to the customer and confirmation associated with the request to buy the product is requested from the customer. In some embodiments, the message sent to the customer comprises a popup message. In some embodiments, the message may dynamically appear at the webpage associated with the payment information form. In some embodiments, the customer's request to buy the product causes some front-end logic and/or computer code to execute and to call a logic and/or computer code at the back-end that determines whether the price has been updated by the seller. In the event that the price has been updated, the back-end logic and/or computer code generates and sends a message to the customer. In some embodiments, once the message has been sent to the customer, the confirmation associated with the request to buy the product is requested of the customer. For example, the update price may be presented to the customer (e.g., the updated price may be included in the message or the customer may refresh the web browser application to see the updated price) and then the customer must submit payment information again in order to complete the transaction. In the event that the customer does not confirm the purchase by submitting payment information again, for example, then the transaction does not complete (because by virtue of the update in price to the product, the customer's previous submission of payment information prior to being presented the updated price was not used to complete the transaction).

Figure 5:
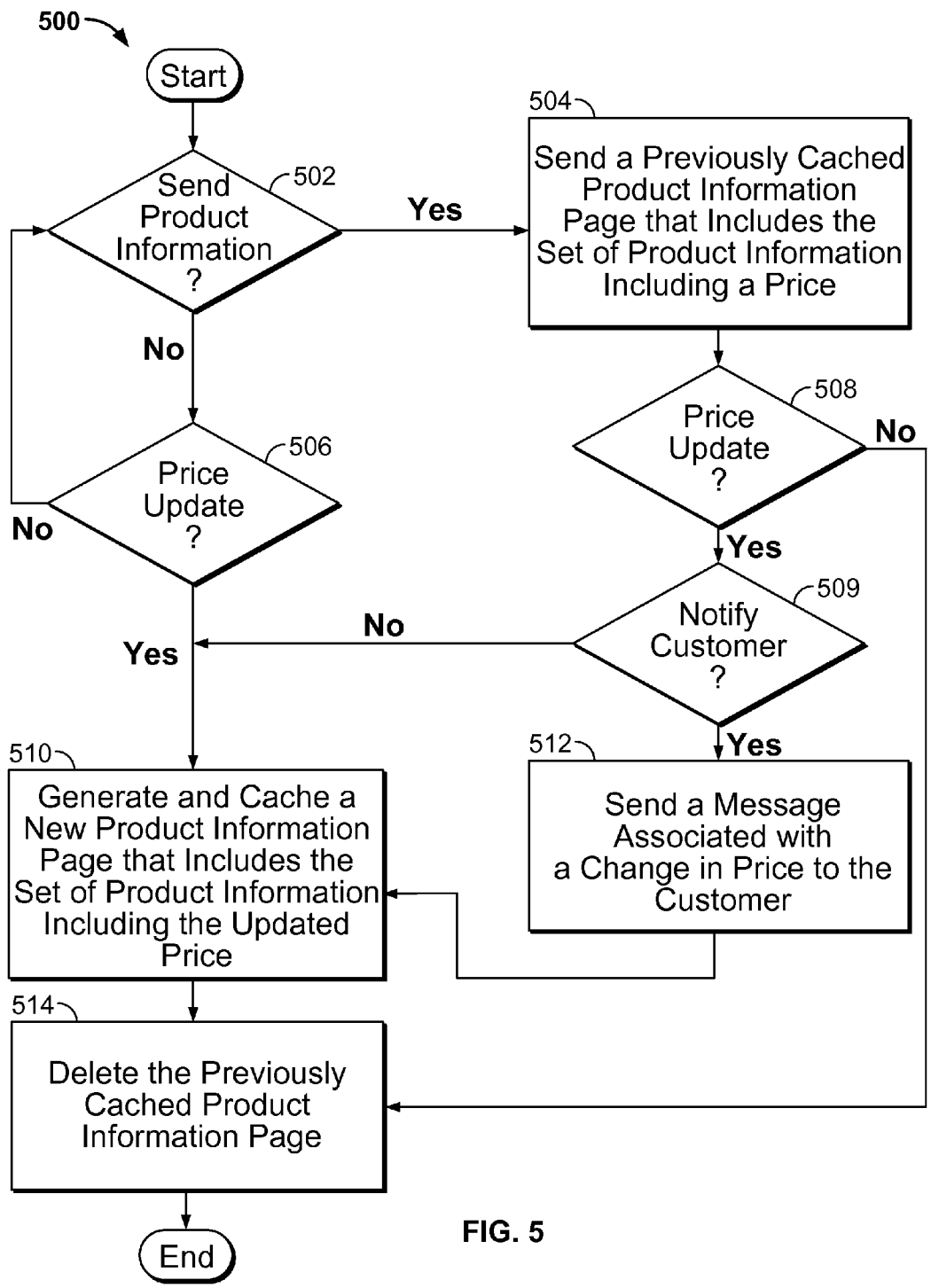
FIG. 5 is a flow diagram showing an embodiment of a process for managing product information pages.

FIG. 5 is a flow diagram showing an embodiment of a process for managing product information pages. In some embodiments, process 500 may be implemented at system 100.

Process 500 may be used to send and generate product information pages in a real-time price update product purchase system.

At 502, it is determined whether a set of product information associated with a product is to be sent. For example, if a customer requested to review the set of product information associated with the product, the set of product information would be sent. In the event that the set of product information is to be sent, control passes to 504. Otherwise, in the event that the set of product information is not to be sent, control passes to 506.

Assume that in an example, a customer requests to review information for the product of a digital image titled "Autumn Blues."

At 504, a previously cached product information page that includes the set of product information including a price is sent. In some embodiments, a product information page that includes the product information was previously generated and cached. As mentioned above, in some embodiments, a product information page includes at least some of the product information stored for a particular product, such as the price, identification, and/or preview, for example. In some embodiments, once the page is generated, it remains static. In some embodiments, a product information page may be generated using markup language. Generating and caching a page in advance of a request for the content included in the page could save resources later when such a request is received. In some embodiments, if no product information page is cached (e.g., because no product information page had been previously generated), then at 504, a product information page is generated and cached. In some embodiments, to send the requested set of product information to a customer, the product information page is retrieved from cache and sent to the customer.

Returning to the previous example, a previously cached product information page for the image "Autumn Blues" is retrieved and sent to the customer. The customer may view the page, which includes at least a thumbnail of the "Autumn Blues" image and the current price of the image, which is $1.

At 508, it is determined whether a price update has been stored since the previously cached product information page was sent. The seller of the product for which the product information page was sent to the customer may submit a price update. In the event that a price update has been stored, control passes to 509. Otherwise, in the event that a price update has not been stored, the process ends.

Returning to the previous example, as the customer is reviewing the product information page that includes the price of $1, the seller updates the price of the image from $1 to $2 and stores the update.

At 509, it is determined whether to notify a customer. Because the price of the product has been updated since the previously cached product information page was sent to the customer, it may be determined that a message notifying the customer of the change in price is to be sent. In some embodiments, this determination may be based on condition(s) configured by a system administrator and/or by the seller. For example, a condition to send the message may comprise that the updated price is greater than the price before the update. In the event that the customer is to be notified, control passes to 512. Otherwise, in the event that the customer is not to be notified, the process proceeds to 510.

Returning to the previous example, assume that a condition in which to send the message associated with the price change is if the updated price is greater than the price before the update. Because the updated price of the image "Autumn Blues" is $2, which is greater than the $1 price before the update, it is determined that a message is to be sent.

At 512, a message associated with a change in price is sent to the customer. For example, the message may indicate to the customer that the price has been changed and may or may not include the updated price. After 512, the process proceeds to 510 because regardless of whether a message associated with a change in price is sent to a customer, a new product information page is to be generated in response to a received update to the price of a product.

Returning to the previous example, the customer who is viewing the product information page that includes the price of $1 is sent the message associated with the change in price (e.g., in response to submitting payment information).

At 506, it is determined whether a price update has been stored since the previously cached product information page was not sent. The seller of the product for which the product information page was not sent to a customer may submit a price update. In the event that a price update has been stored, control passes to 510. Otherwise, in the event that a price update has not been stored, the process returns to 502.

Returning to the previous example, now assume that no customer had requested the set of product information for the image "Autumn Blues" while the price was $1.

At 510, a new product information page that includes the set of product information including the updated price is generated and cached. In response to the price update, a new product information page including the updated price is generated and cached for subsequent requests for the product information.

Returning to the previous example, regardless of whether the product information page including the price of $1 is sent to a customer or not, once the price was updated to $2, a new product information page that includes the price of $2 is generated and cached. So, for a subsequently received request for the set of product information, the new product information page that includes the updated price of $2 would be sent to the customer.

At 514, the previously cached product information page is deleted. In some embodiments, once a new product information page is generated in response to a price update, the previously generated product information page is deleted. In some embodiments, the previously generated product information page may be at least temporarily maintained even after the new product information page has been generated.

Returning to the previous example, the product information page including the price of $1 may be deleted and the product information page including the price of $2 will be cached to service future requests for the product information of the image "Autumn Blues."

Figure 6:
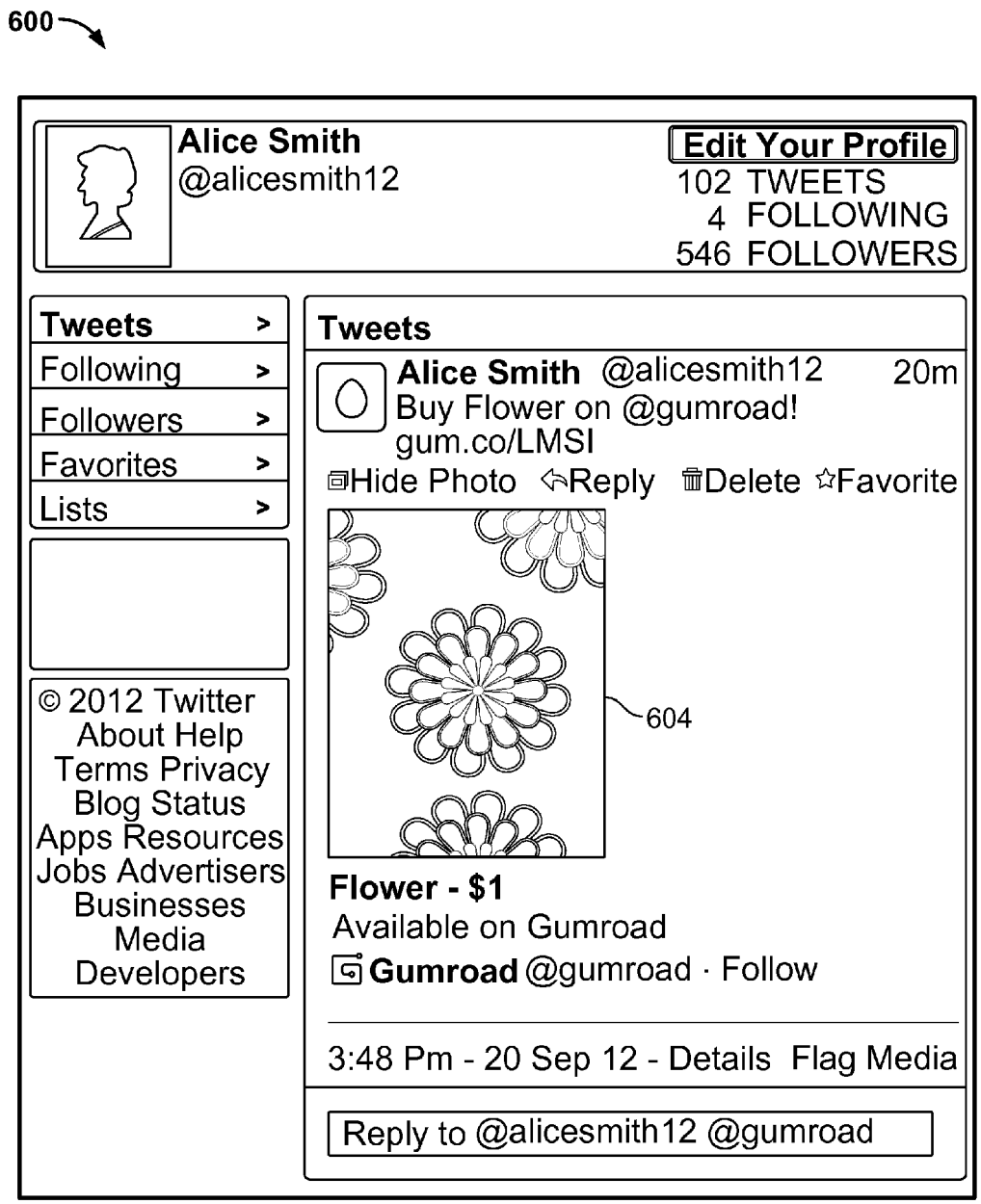
FIG. 6 is a diagram showing an example of a link shared at a user's Twitter® profile.

FIG. 6 is a diagram showing an example of a link shared at a user's Twitter® profile. In the example of webpage 600, the link "gum.co/LMSI" was generated for a product sold by the seller Alice Smith and is shared by Alice Smith (with handle "@alicesmith12") at her Twitter® profile through a Tweet®. As shown in the example, Alice Smith tweeted at 3:48 pm on the 20 Sep., 2012, the message "Buy Flower on @Gumroad! gum.co/LMSI." Below the Tweet®, a "View photo" option (not shown) was selected and so preview 604 of the product is displayed, along with the name ("Flower") and price ("$1") of the product. For example, the posted Tweet® including the message "Buy Flower on @Gumroad! gum.co/LMSI" (and associated preview, name, and price) may be the result of Alice Smith manually copying the link portion of the generated link and HTML tags that were presented for the user and manually sharing it on Twitter®. A customer who can view @alicesmith12's Tweet® may select the shown link ("gum.co/LMSI") to request to review product information associated with the product.

As shown in the example of FIG. 6, a seller with a Twitter® account may easily advertise a product to all of the seller's Twitter® followers by sharing/publishing via a Tweet® a link associated with the product for sale at the product purchase system. By allowing a seller to Tweet® a link to a product, the product purchase system leverages the trust relationship between the seller and the seller's Twitter® followers such that the seller's followers may rely on the authenticity of the poster of the Tweet® to know that the product is also authentic and/or of a desirable quality. For example, a Twitter® seller who is a musician may release a new single by submitting the appropriate product information to the product purchase system and receiving a generated link. The musician may then Tweet® the link to all of his fans that follow him on Twitter® and the fans can purchase the single through the Tweeted link.

Figure 7:
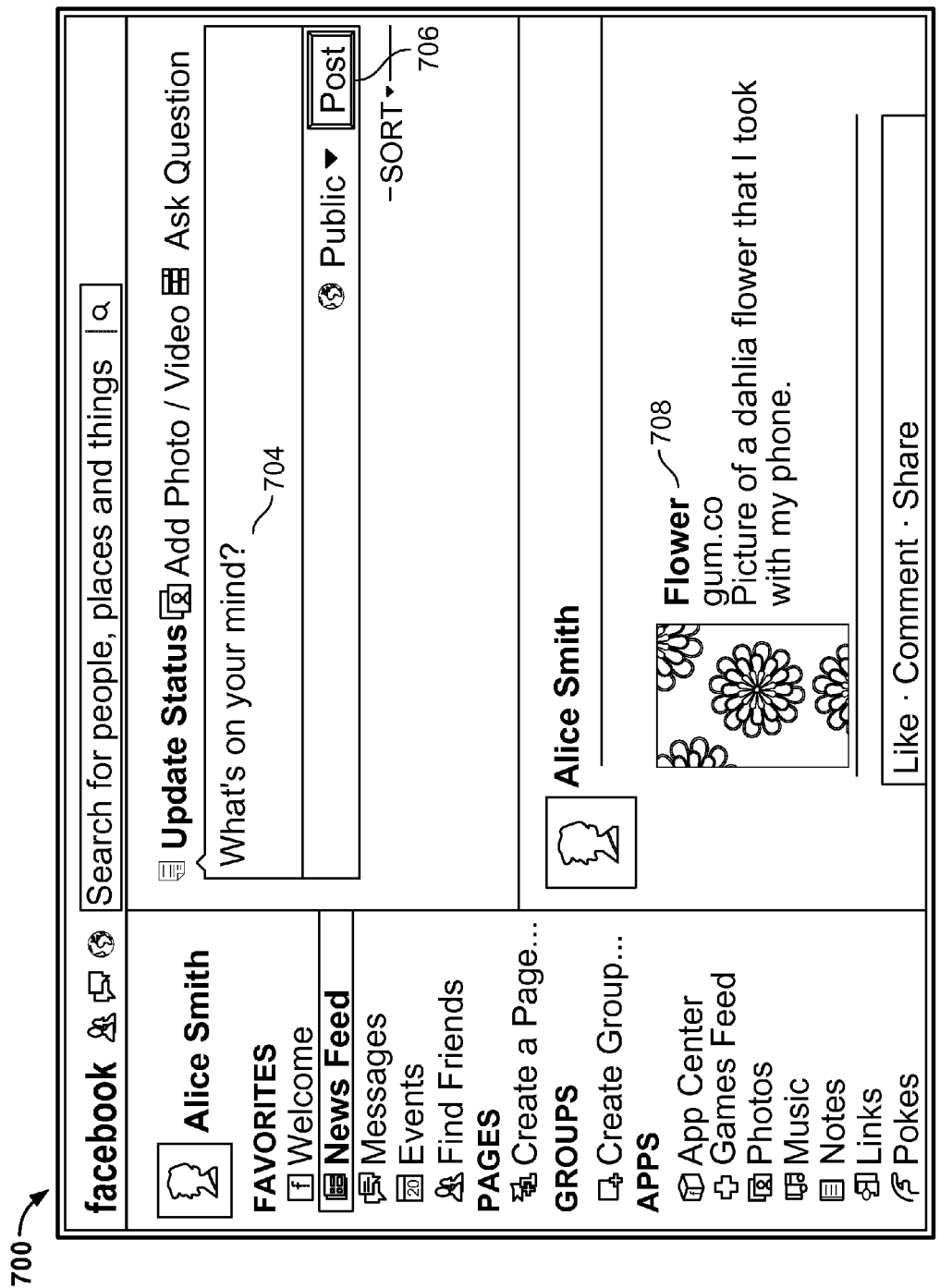
FIG. 7 is a diagram showing an example of a link shared at a user's Facebook® profile.

FIG. 7 is a diagram showing an example of a link shared at a user's Facebook® profile. In the example, a link "gum.co/LMSI" was generated for a product sold by seller Alice Smith and is shared by Alice Smith at her Facebook® profile through a post. Post 708 on webpage 700 includes the selectable name of the product ("Flower") that is linked to "gum.co/LMSI" (not shown), the domain associated with the link ("gum.co"), and the descriptive text of the product ("Picture of a dahlia flower that I took with my phone"). For example, post 708 may be the result of Alice Smith inputting the link "gum.co/LMSI" at post window 704 and then selecting the "Post" button 706 (e.g., which caused the product purchase system to communicate with a third party server associated with Facebook® to post the message at Alice Smith's Facebook® profile). A user who can view Facebook® post 708 may select the shown preview or selectable name ("Flower") to request to review product information associated with the product.

As shown in the example of FIG. 7, a seller with a Facebook® account may easily advertise a product to all of the seller's Facebook® friends (or those with appropriate access privileges) by sharing/publishing via a Facebook® post a link associated with the product for sale at the product purchase system. By allowing a seller to post a link to a product on Facebook®, the product purchase system leverages the social graph of the seller to enable the seller to reach those of the seller's friends or other connected users that the seller would like to advertise to. Additionally, the Facebook® friends of the seller that have permission to see the post may also rely on the authenticity of the Facebook® seller to know that the product is also authentic and/or of a desirable quality.

Figure 8:
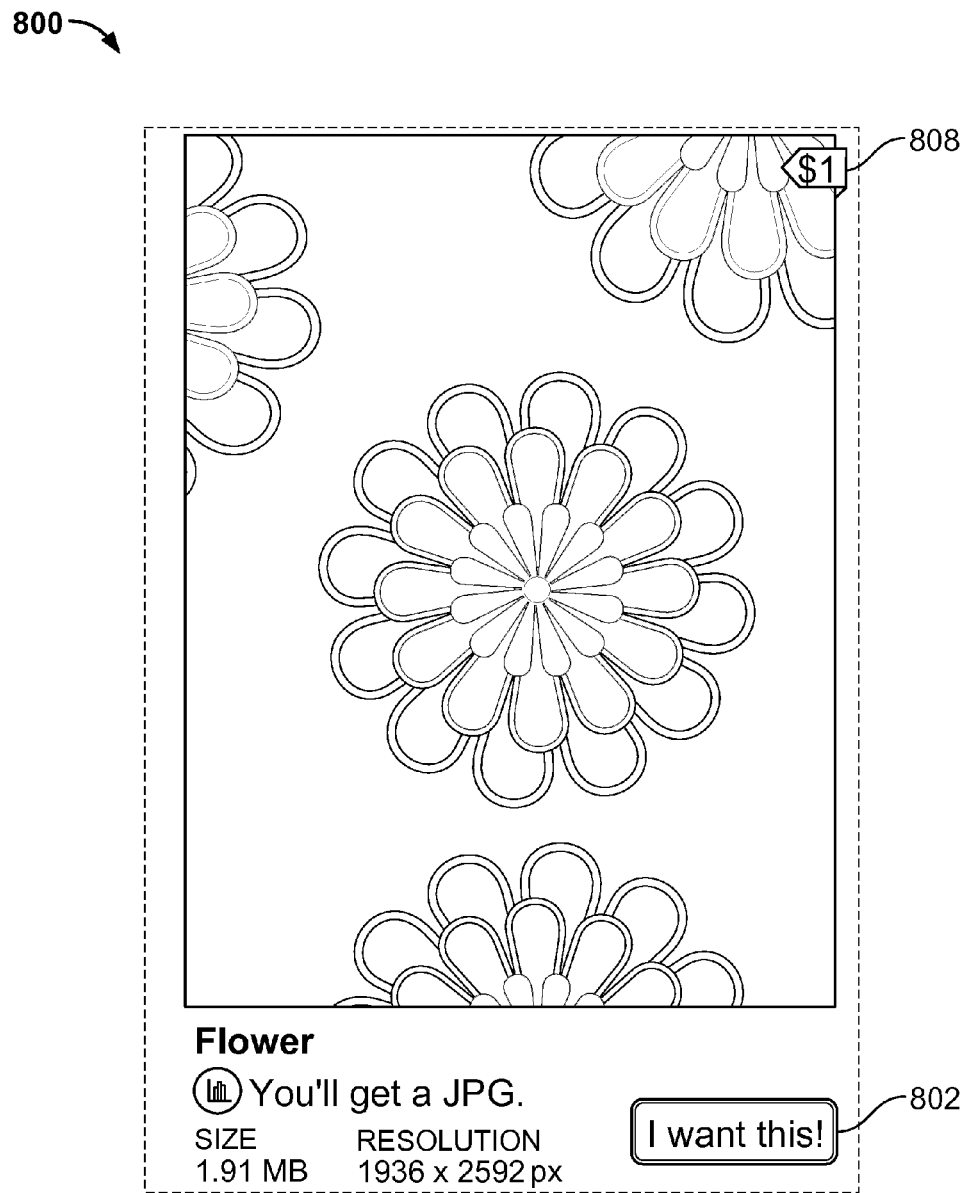
FIG. 8 is a diagram showing an example of a set of product information and a control that are presented at an interactive webpage in response to an activation of a link associated with the product purchase system.

FIG. 8 is a diagram showing an example of a set of product information and a control that are presented at an interactive webpage in response to an activation of a link associated with the product purchase system. In some embodiments, interactive webpage 800 may include at least in a part a previously generated product information page that is retrieved from cache. For example, interactive webpage 800 is presented in response to a customer's selection of a link. For example, interactive webpage 800 may be presented for a customer in response to the customer's selection of the link shown in the Tweet® of FIG. 6 or the Facebook® post of FIG. 7. In the example, interactive webpage 800 may be presented at a webpage different than the one in which the link was shared/published. In the example, interactive webpage 800 is presented at the website of the product purchase system service referred to as Gumroad™. In the example, the preview (a smaller version of the image of the flower image that is the product) is presented with the product information such as price 808 of the product (the full-sized flower image), the name of the product ("Flower"), the file format of the product ("You'll get a JPG"), the size of the product ("1.91 MB"), and the resolution of the product ("1936×2592 px"). As shown in the example, at the time that the product information was sent to the customer, area 808 shows that the price of the product was $1. In the example, "I want this!" button 802 represents the control associated with requesting the payment information form associated with the product.

Figure 9:
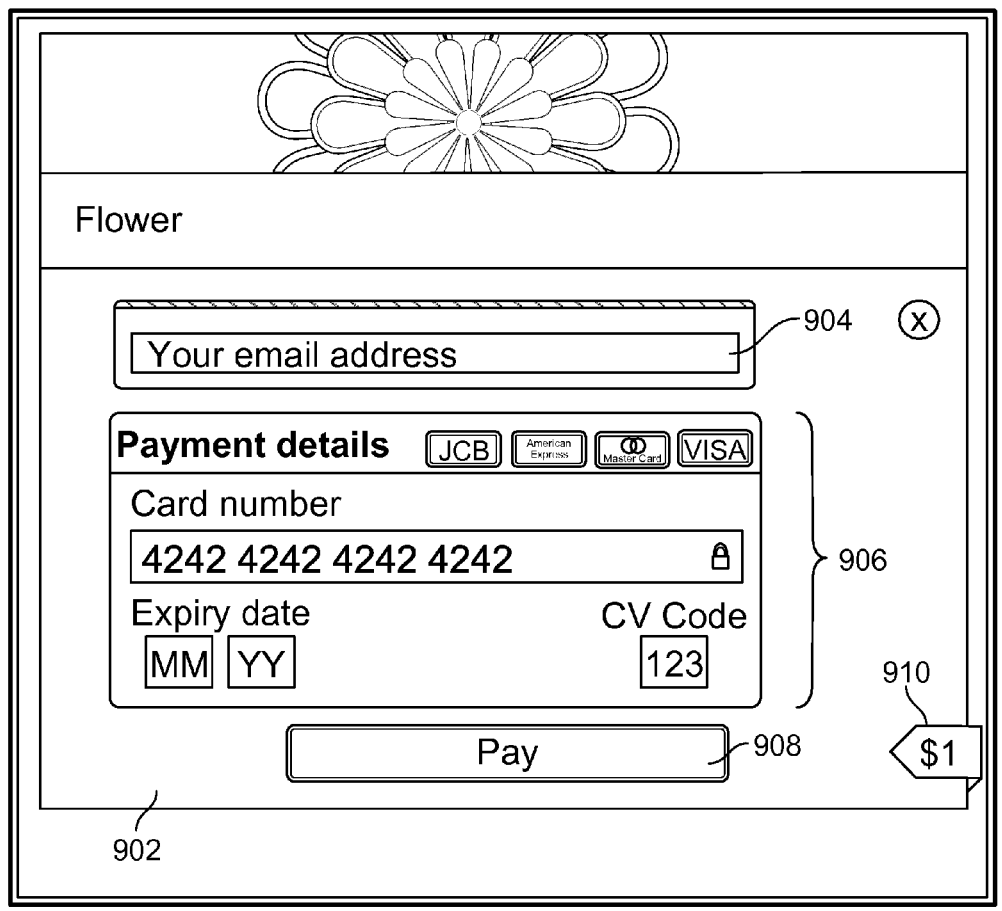
FIG. 9 is a diagram showing an example of a form associated with payment information.
Figure 9:

FIG. 9 is a diagram showing an example of a form associated with payment information. In the example, form 902 is presented in response to a customer's selection of "I want this!" button 802 of interactive webpage 800. For example, interactive webpage 800 may be dynamically updated to present form 902. At form 902, a customer is required to input contact information in the form of an email address in field 904. In section 906, the customer is required to input information associated with a credit card that the customer would like to use for the payment of the product.

In some embodiments, contact and/or payment information may be stored for a customer with a registered account with a website associated the product purchase system (e.g., "www.gumroad.com"). In some embodiments, if the registered customer has logged onto the website associated with the product purchase system and then subsequently accesses a form associated with payment information such as form 902, then any stored contact and/or payment information for the customer may be dynamically prepopulated into the appropriate fields of the form. This way, a registered customer of the service may store his or her contact and/or payment information once and avoid needing to repeat providing such information at future forms for purchasing products. Once the customer has completed form 902, he or she can select "Pay" button 908 to submit the contact and payment information and also to send a request to buy the product.

In some embodiments, in response to the customer's request to buy the product, a front-end logic and/or computer code is executed. The front-end logic and/or computer code tries to validate the purchase of the product and also checks whether the price has been updated. In some embodiments, the customer's submission of payment information triggers the execution of the front-end logic and/or computer code. For example, returning to the example of FIG. 9, the customer's selection of "Pay" button 908 may act as the trigger for the front-end code. The following is an example of such front-end computer JavaScript code:

```
$.ajax({
    type: "POST",
    url: "/purchases",
    data: $formClone.serialize( ),
}).done(function(data) {
    if(!data.success) {
        //show messaging to user
    }
});
```

In some embodiments, the front-end logic and/or computer code is configured to call a related back-end logic and/or computer code. In some embodiments, the back-end computer code is configured to validate the purchase and check whether the price that was sent to the customer included in the requested product information has since changed. The following is an example of such back-end computer JavaScript code:

```
def perceived_price_cents_matches_price_cents
    return if perceived_price_cents.nil?
    return if perceived_price_equals_link_price
    return if customizable_price_that_has_not_changed
    errors.add(:price_cents, I18n.t(perceived_price_cents-
        _not_matching))
end
def perceived_price_equals_link_price
    perceived_price_cents.to_i==link.price_cents
end
```

For example, in the example of the back-end computer code above, the "perceived_price" variable represents the price that was sent to the customer in the requested product information and the "link_price" variable represents the most up-to-date price of the product. The example back-end computer compares the "perceived_price" to the "link_price" to determine whether the two variables match. If the two variables match, then it is determined that the price has not been updated. If the two variables do not match, then it is determined that the price has been updated. In some embodiments, in the event that it is determined that the price has been updated, a message associated with a change in price may be sent to the customer.

Figure 10:
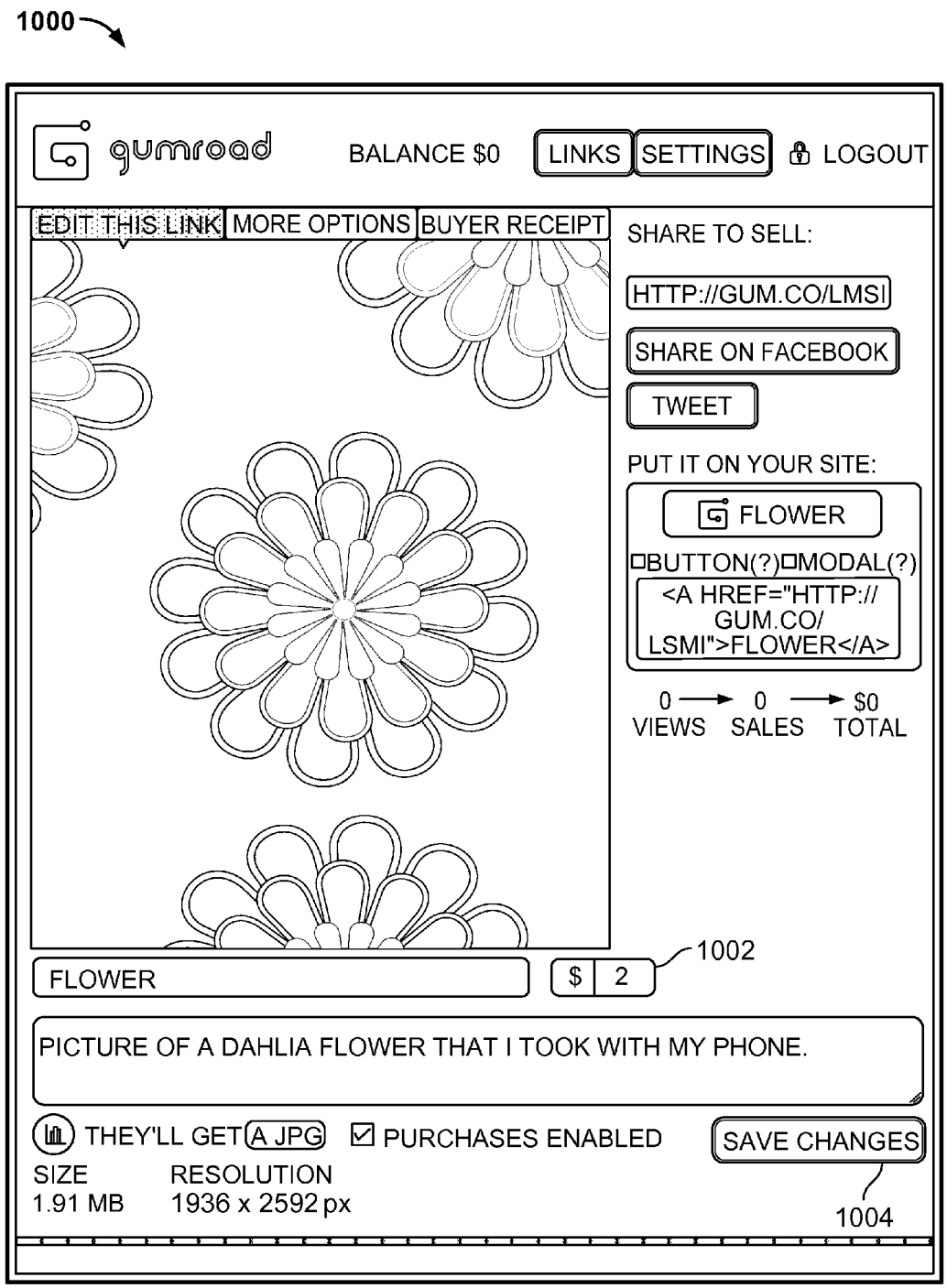
FIG. 10 is a diagram showing an example of an interactive webpage for editing product information.

FIG. 10 is a diagram showing an example of an interactive webpage for editing product information. Interactive webpage 1000 may be shown to the seller (e.g., Alice Smith) in response to the seller's selection to edit previously submitted product information. Among the portions of the product information that the seller may edit include price field 1002. Assume that the set of product information that is currently being edited in interactive webpage 1000 is associated with the product for which the customer had requested the product information page shown in FIGS. 8 and 9. Whereas the price of the product was shown in area 808 of the product information page as $1 in FIG. 8 and shown in area 910 of the payment information form in FIG. 9 as $1, the seller may have edited the price in price field 1002 from $1 to $2 at price field 1002 of interactive webpage 1000 and then selected "Save changes" button 1004 prior to the customer selecting "Pay" button 908 of FIG. 9. In such an event that the price that was presented for a customer is updated before the customer submits the payment information, in some embodiments, a message may be sent to the customer to indicate to the customer a change in price.

Figure 11:
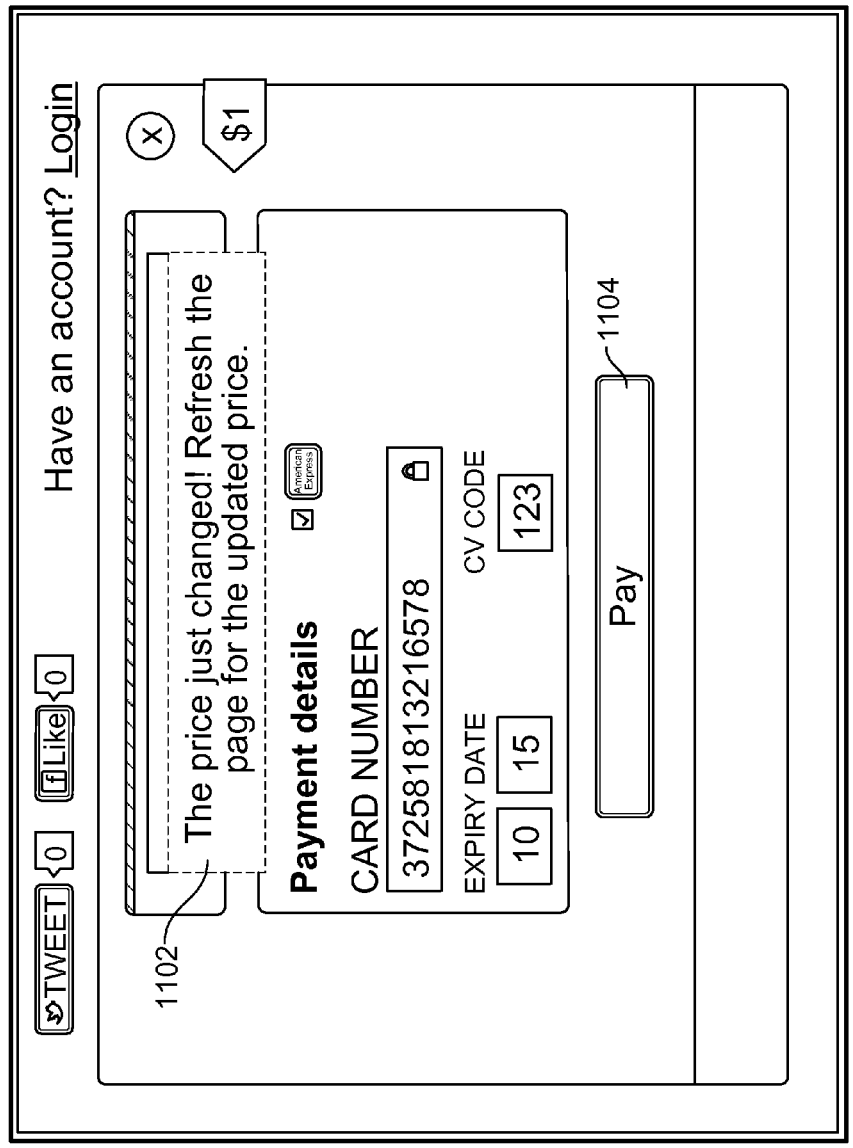
FIG. 11 is a diagram showing an example of an interactive webpage including a message indicating a change in price of a product.

FIG. 11 is a diagram showing an example of an interactive webpage including a message indicating a change in price of a product. Assuming that the seller of the product for which the customer was submitting payment information over the payment information form of FIG. 9 updated the price of the product (e.g., using a user interface for editing product information such as interactive webpage 1000) from $1 to $2 while the customer was browsing the product information and/or completing the payment information form. In response to the customer's attempt to submit the provided payment information by selecting "Pay" button 1104, it is determined that the price has changed from $1 to $2. Due to the update in price after the product information was presented to the customer in the example of FIG. 8 and before the customer's submission of the payment information, message associated with a change in price 1102 is dynamically sent and presented to the customer. In the example, message 1102 includes the following text: "The price just changed! Refresh the page for the updated price." In some embodiments, the message is configured using JavaScript. Subsequent to the presentation of message 1102, the customer may not successfully purchase the product by submitting the provided payment information via selecting "Pay" button 1104 until the customer refreshes the page to view the updated price. For example, to refresh the page, the customer may select the refresh feature of the web browser.

Figure 12:
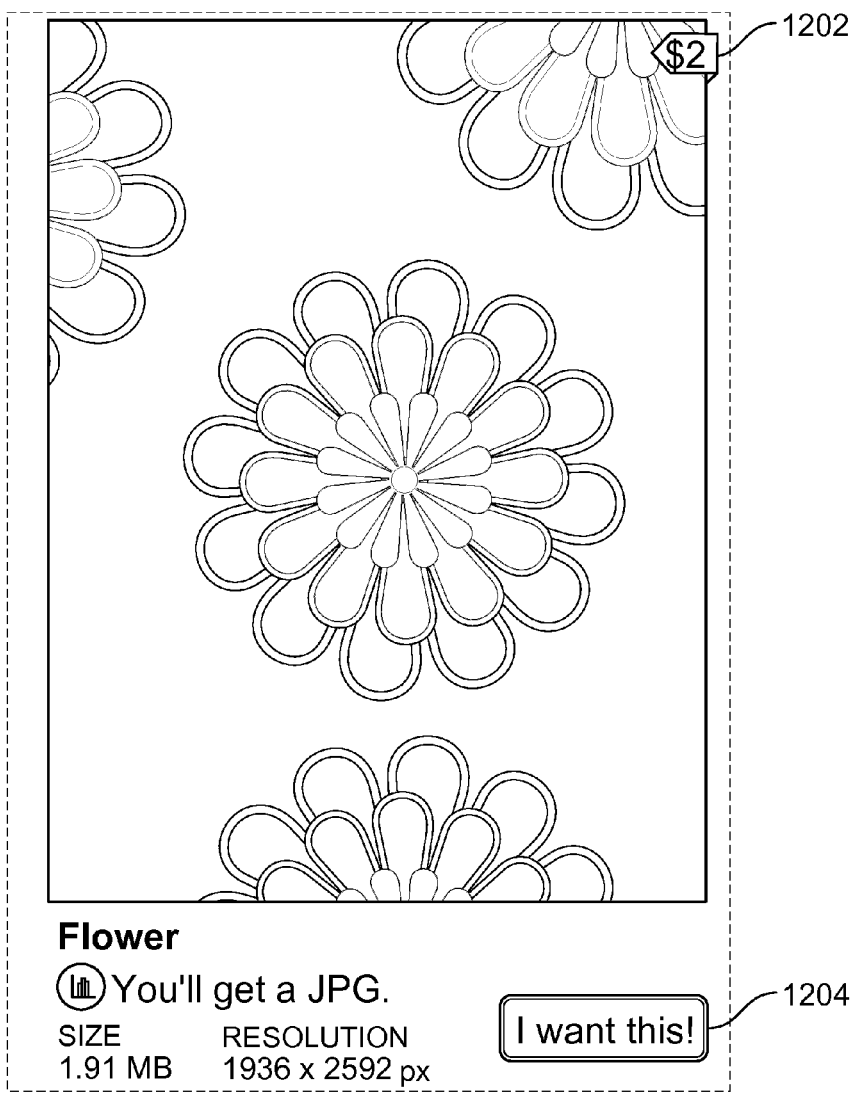
FIG. 12 is a diagram showing an example of a set of product information including an updated price that is presented at an interactive webpage in response to the page refresh.

FIG. 12 is a diagram showing an example of a set of product information including an updated price that is presented at an interactive webpage in response to the page refresh. For example, if the customer that received message 1102 of FIG. 11 refreshed the page, interactive webpage 1200 would be presented for the customer, including the updated price of $2, which is included in area 1202. In order to complete purchase of the product, the customer is to select "I want this!" button 1204 to submit payment information again to confirm the purchase of the product at the updated price of $2.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating cached product information pages, comprising:
   a memory storing instructions; and
   a processor coupled to the memory and configured to cause performance of steps comprising:
   generate, by the processor, a cached product information page associated with a product using markup language;
   store the cached product information page in a database;
   receive a request from a customer to review a set of product information associated with the product;
   send, by the processor, the cached product information page to an interface of the customer, wherein the cached product information page includes at least a price associated with the product;
   subsequent to sending the cached product information page to the interface of the customer, receive an update to the price from a seller associated with the product;
   in response to the received update to the price from the seller associated with the product, generate, by the processor using markup language, a new cached product information page associated with the product, wherein the new cached product information page includes the updated price;
   subsequent to the received update to the price from the seller associated with the product, receive a first request to purchase the product including a submission of payment information from the customer;
   in response to the submission of the payment information from the customer to purchase the product, determine by the processor that the price has been updated by the seller; and
   in response to the determination that the price has been updated by the seller:
   prevent, by the processor, the submitted payment information from being used to complete the first request to purchase;
   dynamically generate, by the processor, a message associated with a change in price;
   present, via the interface of the customer, the dynamically generated message to the customer; and
   send, as a replacement of the cached product information page, the new cached product information page associated with the product to the interface of the customer.

2. The system of claim 1, wherein in response to the determination that the price has been updated by the seller, the processor is further configured to:
   receive a subsequent request from the customer to review the set of product information associated with the product; and
   receive a subsequent submission of payment information from the customer to purchase the product.

3. The system of claim 1, wherein in response to the received update to the price from the seller, the processor is further configured to delete the previously cached product information page associated with the product.

4. The system of claim 1, wherein the request to review the set of product information is associated with an activation of a link associated with the product.

5. The system of claim 1, wherein the submission of the payment information from the customer comprises a submission of data input into a form.

6. The system of claim 1, wherein it is determined that the updated price is greater than the price before the update.

7. The system of claim 1, wherein the product is in an orderable state subsequent to the received update to the price.

8. The system of claim 1, wherein the message comprises a popup message.

9. The system of claim 1, wherein the set of product information associated with the product includes one or more attributes that were automatically detected from uploaded data associated with the product.

10. The system of claim 1, wherein the submission of the payment information from the customer to purchase the product is configured to cause a piece of front-end computer code to be executed, wherein the executed piece of front-end computer code is configured to cause a corresponding piece of back-end computer code to be executed, wherein the executed piece of back-end computer code is configured to determine that the price has been updated by the seller.

11. A method for generating cached product information pages, comprising:
- generating, by a processor using markup language, a cached product information page associated with a product;
- storing the cached product information page in a database;
- receiving a request from a customer to review a set of product information associated with the product;
- sending, by the processor, the cached product information page to an interface of the customer, wherein the cached product information page includes at least a price associated with the product;
- subsequent to sending the cached product information page to the interface of the customer, receiving an update to the price from a seller associated with the product;
- in response to the received update to the price from the seller associated with the product, generating, by the processor using markup language, a new cached product information page associated with the product, wherein the new cached product information page includes the updated price;
- subsequent to the received update to the price from the seller associated with the product, receiving a first request to purchase the product including a submission of payment information from the customer to purchase the product;
- in response to the submission of the payment information from the customer to purchase the product, determining, by the processor, that the price has been updated by the seller;
- in response to the determination that the price has been updated by the seller:
  - preventing, by the processor, the submitted payment information from being used to complete the first request to purchase;
  - dynamically generating, by the processor, a message associated with a change in price;
  - presenting, via the interface of the customer, the dynamically generated message to the customer; and
  - sending, as a replacement of the cached product information page, the new cached product information page associated with the product to the interface of the customer.

12. The method of claim 11, wherein in response to the determination that the price has been updated by the seller, further comprising:
- receiving a subsequent request from the customer to review the set of product information associated with the product; and
- receiving a subsequent submission of payment information from the customer to purchase the product.

13. The method of claim 11, wherein in response to the received update to the price from the seller, further comprising deleting the previously cached product information page associated with the product.

14. The method of claim 11, wherein the request to review the set of product information is associated with an activation of a link associated with the product.

15. The method of claim 11, wherein the submission of the payment information from the customer comprises a submission of data input into a form.

16. The method of claim 11, wherein it is determined that the updated price is greater than the price before the update.

17. The method of claim 11, wherein the product is in an orderable state subsequent to the received update to the price.

18. The method of claim 11, wherein the message comprises a popup message.

19. A computer program product for generating cached product information pages, the compute program product being embodied in a non-transitory computer readable storage medium and comprising computer instructions for causing performance of steps comprising:
- generating, by a processor using markup language, a cached product information page associated with a product;
- storing the cached product information page in a database;
- receiving a request from a customer to review a set of product information associated with the product;
- sending, by the processor, the cached product information page to an interface of the customer, wherein the cached product information page includes at least a price associated with the product;
- subsequent to sending the cached product information page to the interface of the customer, receiving an update to the price from a seller associated with the product;
- in response to the received update to the price from the seller associated with the product, generating, by the processor using markup language, a new cached product information page associated with the product, wherein the new cached product information page includes the updated price;
- subsequent to the received update to the price from the seller associated with the product, receiving a first request to purchase the product including a submission of payment information from the customer to purchase the product;
- in response to the submission of the payment information from the customer to purchase the product, determining, by the processor, that the price has been updated by the seller; and
- in response to the determination that the price has been updated by the seller:
  - preventing, by the processor, the submitted payment information from being used to complete the first request to purchase;
  - dynamically generating, by the processor, a message associated with a change in price;
  - presenting, via the interface of the customer, the dynamically generated message to the customer; and
  - sending, as a replacement of the cached product information page, the new cached product information page associated with the product to the interface of the customer.

* * * * *